(12) United States Patent
Morsbach

(10) Patent No.: US 6,168,011 B1
(45) Date of Patent: Jan. 2, 2001

(54) ACCUMULATION CONVEYOR SYSTEM

(75) Inventor: Paul Morsbach, Berg (DE)

(73) Assignee: SWS Scharf-Westfalia Industrial Systems GmbH, Lunen (DE)

( * ) Notice: Under 35 U.S.C. 154(b), the term of this patent shall be extended for 0 days.

(21) Appl. No.: 09/140,690

(22) Filed: Aug. 26, 1998

Related U.S. Application Data

(60) Provisional application No. 60/073,047, filed on Jan. 30, 1998.

(51) Int. Cl.[7] .................................................. B65G 17/00
(52) U.S. Cl. ........................... 198/779; 198/721; 198/732
(58) Field of Search ................................... 198/779, 732, 198/721

(56) References Cited

U.S. PATENT DOCUMENTS

| | | | |
|---|---|---|---|
| 722,689 | * | 3/1903 | Frink et al. .......................... 198/779 |
| 1,852,942 | | 4/1932 | Streine . |
| 2,198,036 | * | 4/1940 | Isted ..................................... 198/779 |
| 2,777,566 | * | 1/1957 | King ..................................... 198/779 |
| 3,040,379 | * | 6/1962 | Bayer ................................... 198/732 |
| 3,197,020 | | 7/1965 | Evans et al. . |
| 3,554,132 | * | 1/1971 | Hanna et al. ........................ 198/732 |
| 3,568,809 | * | 3/1971 | Macdonald ........................... 198/779 |
| 3,677,686 | * | 7/1972 | Powel ................................... 198/732 |
| 4,293,064 | * | 10/1981 | Robinson ............................. 198/779 |
| 4,852,718 | | 8/1989 | Kunstmann . |
| 5,261,525 | * | 11/1993 | Garbagnati .......................... 198/779 |
| 5,344,001 | * | 9/1994 | Kawaai et al. ....................... 198/779 |

FOREIGN PATENT DOCUMENTS

| | | |
|---|---|---|
| 2210341 | 9/1972 | (DE) . |
| 40 01 529 C2 | 7/1990 | (DE) . |
| 39 34 233 A1 | 10/1990 | (DE) . |
| 41 17 509 C1 | 7/1992 | (DE) . |
| 0 277 258 B1 | 8/1990 | (EP) . |

* cited by examiner

Primary Examiner—Douglas Hess
(74) Attorney, Agent, or Firm—Blank Rome Comisky & McCauley LLP

(57) ABSTRACT

An accumulation conveyor system for transporting piece goods along a predetermined path is disclosed. The system comprises a passively transporting element and an actively transporting element. The passively transporting element comprises a series of idle rollers arranged substantially in parallel with each other and form an elongated and substantially continuous and substantially equiplanar path for supporting the goods. An endless conveyor belt is provided for circulating around at least two guide rolls and forms an upper train for motion in a first direction and a lower train for motion in a second direction opposite to said first direction. The passively transporting element and the actively transporting element cooperate to convey the goods along a predetermined path and provides for smooth accumulation of the goods when movement of the goods closest to the delivery end is arrested.

12 Claims, 4 Drawing Sheets

ACCUMULATION CONVEYOR SYSTEM

This application claims priority from Provisional Application Ser. No. 60/073,047, filed Jan. 30, 1998, herein incorporated by reference in its entirety and for all purposes.

BACKGROUND OF THE INVENTION

This invention generally relates to the art of conveying articles and specifically to an accumulation conveyor system of the type used for transporting piece goods, such as palettes, along a predetermined path.

PRIOR ART

When conveying piece goods, i.e. goods having a substantial length and width, such as palettes, along a predetermined path, e.g. in the course of handling, processing, charging or discharging the palettes, it may happen that a palette at the upstream end of a conveying path is arrested for some reasons so as to cause accumulation of the palettes downstream of the stoppage. Consequently, the conveying system must smoothen the accumulation without damage to the transported goods and the conveying system.

A system suitable for this type of operation has been disclosed in U.S. Pat. No. 4,852,718 and comprises a pair of endless belts, each carrying a number of so called axle mounts secured to the conveyor belts, a roller mount rotatably secured to each of the elastic rubber axle mounts and generally extending rearwards from the mounts, each roller mount having spaced apart generally parallel side walls, support rollers rotatably secured to the roller mount on the outside of the side wall thereof, and a retaining roller also rotatably secured to the roller mount but between the side wall thereof, the retaining roller supportingly engaging article for transport along a path of travel and rotating freely underneath stalled accumulated articles. The width of the conveyor belts is small in relation to the width of the goods to be transported.

A characteristic property of this prior art system is the fact that each of the two conveyor belts requires at least one drive or, in other words, both belts are actively transporting elements.

Objects of the Invention and Brief Summary

Accordingly, it is a first main object of the invention to provide for an improved accumulation conveyor and conveyor system which is operable with only one active, i.e. motordriven, belt which supports only a portion of the base surface of the palettes or other piece goods.

Another object is to reduce energy consumption, maintenance, operating cost, and wear of the conveying system.

Further objects will become apparent as this specification proceeds.

Now, the above objects will be achieved according to a first general embodiment of the invention by means of an accumulation conveyor suitable for use as an actively transporting (i.e. actuated by a drive) element comprising an endless conveyor belt for circulation around at least two guide rolls and forming an upper train for motion in a first direction and a lower train for motion in a second direction opposite to said first direction, at least one of said guide rolls being connected with a drive; a plurality of mutually distanced trolleys connected to said endless conveyor belt; rail means for supporting said trolleys at least in the area of said upper train; wherein each of said trolleys comprises two pairs of support rollers for interaction with said rail means; a pair of bracket means for interconnecting said two pairs of support rollers; and a buffer roller supported by said bracket means in a freely rotatable manner between said two pairs of support rollers and distanced from said conveyor belt; said rail means comprising an essentially horizontal element for vertically supporting said trolleys, and an essentially vertical element for laterally guiding said trolleys.

According to a second general embodiment, the invention provides for an accumulation conveyor system for transporting piece goods along a predetermined path, said goods having a base surface defined by a length and a width extending between two sides of said goods; said system comprising in an essentially parallel arrangement and in a mutually spaced relation at least one passively transporting element and at least one actively transporting element substantially as defined above.

According to a third embodiment, the invention provides for a method of conveying piece goods of the type mentioned above by means of an accumulation conveyor system according to the above defined first and second embodiment. Detailed Description of Preferred Embodiments of the Invenetion and Definitions According to a preferred embodiment the inventive accumulation conveyor comprises at least one of said pairs of support rollers of each of said trolleys is provided with lateral slide means for contact with said essentially vertical element of said rail means.

Also, each of the trolleys comprises two rods or bars interconnecting said bracket means and having two ends extending through said bracket means, said support rollers being rotatably mounted on said ends, and said ends of said interconnecting rods or bars further carrying said lateral slide means.

Preferably, the lateral slide means are made of a synthetic polymer composition capable of self-lubrication when in contact with said vertical element of said rail means.

Further, in a preferred embodiment of the invention, the buffer roller consists essentially of a cylindrical body made of a synthetic polymer material, such as a polyamide, polyester, polycarbonate, polyfluoro alkane or the like, optionally containing a lubricating filler such as graphite or molybdenum disulfide, for rotation around an axle made of a structural metal, such as typically steel, said polymer material being capable of self-lubrication when in contact with said axle.

In a typical preferred embodiment the cylindrical body of the buffer roller has an outer diameter and a central bore for holding the axle in a self-lubricating manner while the central bore has a diameter which is at least one third of said outer diameter.

Generally, the endless conveyor belt has a width in the range of typically from about 1.5 to 15 inches (30–300 mm), e.g. 1.5–5 inches (30–00 mm) and is formed of a fiber-reinforced elastomeric material, such as synthetic or natural rubber with conventional additives and elongated fibrous reinforcements extending in longitudinal direction of the belt; typical fibers are continuous filaments made of polyamide including aramides (such as Keflars®), polyalkanes (such as Dyneemae®), polyesters, carbon, glass fibers and metal (e.g. steel) filaments.

The connection between each of the trolleys and the endless conveyor belt is conveniently and preferably formed by a bridge of an elastomeric material; each bridge has two ends one of which will be the leading end while the other is the trailing end. Each end is connected to the belt by adhesive or crosslinking means, optionally reinforced by mechanical connectors and/or metal inserts for receiving a rod or bar to allow for a limited pivoting motion of each trolley relative to the belt.

Preferably, each trolley is provided with an abutting means connected with said brackets and limiting said pivoting motion to an angle of not more than about 30°.

The first direction of motion of the endless conveyor belt defines a leading end and a trailing end of each trolleys and—according to an embodiment preferred for various purposes—the connection between each trolley and the endless conveyor belt is provided near the trailing end of each trolley.

In another typical preferred embodiment the rail means comprise a further essentially horizontal element to form U-shaped channels that open toward the endless conveyor belt.

The invention further provides for an accumulation conveyor system for transporting piece goods, e.g. palettes, crates, boxes and the like, along a predetermined path, the goods having a base surface defined by a length and a width extending between two sides of the goods. According to the invention, the system comprises in an essentially parallel arrangement and in a mutually spaced relation at least one passively transporting element; further, at least one actively transporting element is provided; the at least one passively transporting element consists essentially of a series of idle rollers arranged substantially in parallel with each other and at a distance between any two adjacent rollers which is smaller than the length of the goods, and forming an elongated, substantially continuous and substantially equiplanar path for supporting a portion of the base surface of the goods; the at least one actively transporting element comprises an endless conveyor belt substantially as described above for circulation around at least two guide rolls and forming an upper train for motion in a first direction and a lower train for motion in a second direction opposite to the first direction; at least one of the guide rolls is connected with a drive; a plurality of trolleys is connected to said endless conveyor belt at a mutual distance between any two adjacent trolleys which is smaller than the length of the goods; rail means are provided for supporting said trolleys at least in the area of said upper train; each trolley comprises two pairs of support rollers for interaction with the rail means; a pair of bracket means is provided for interconnecting each pair of support rollers; a buffer roller supported by the bracket means in a freely rotatable manner is provided between each pair of support rollers and distanced from the conveyor belt; the rail means comprise an essentially horizontal element for vertically supporting said trolleys, and an essentially vertical element for laterally guiding said trolleys; the at least one passively transporting element and the at least one actively transporting element are arranged to cooperate for commonly supporting the base surface of each piece good and to convey the piece goods along the predetermined path having a feeding end and a delivery end; the system provides for smooth accumulation of goods along the path as soon as movement of one of the piece goods closest to the delivery end is arrested.

One actively transporting element and one passively transporting element are arranged side by side at a distance for supporting a first base portion of the goods on the actively transporting element and a second base portion of the goods on the passively transporting element.

Alternatively, the actively transporting element is arranged substantially in parallel between two passively transporting elements.

BRIEF DESCRIPTION OF THE DRAWINGS

For a better understanding of the nature and scope of the invention preferred embodiments and details of the accumulation conveyor and conveyor system according to the invention are described in more detail in the following by reference to the drawings, in which.

DETAILED DESCRIPTION OF THE DRAWINGS

Figure 1:
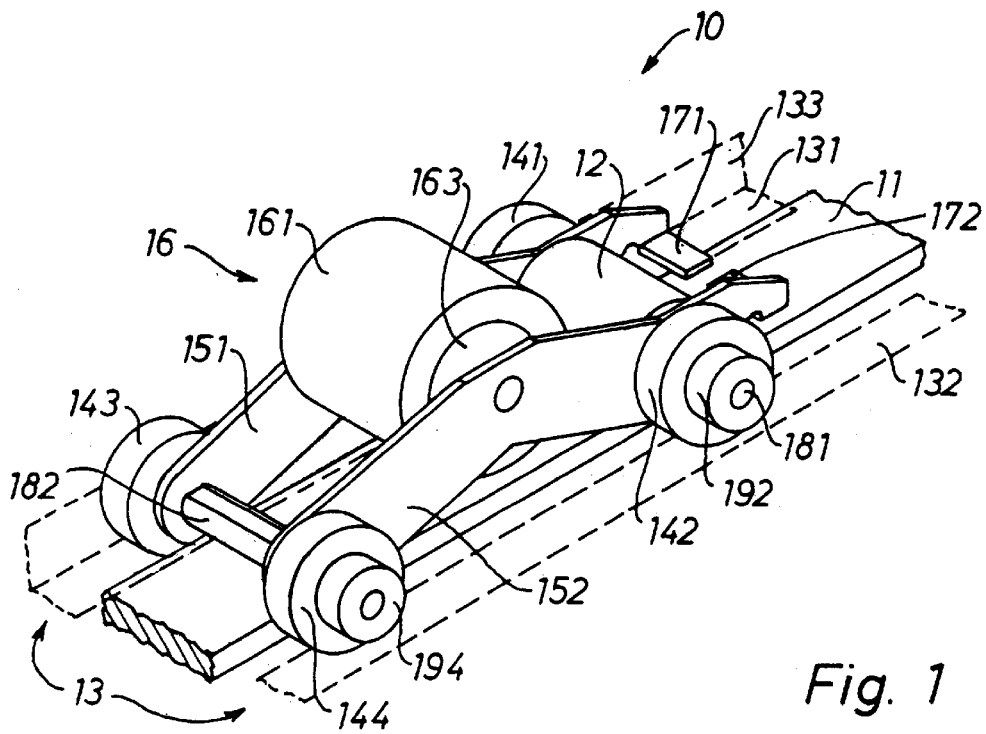
FIG. 1 is a diagrammatic representation of a trolley according to the invention.

FIG. 1 shows trolley 10 connected to endless conveyor belt 11 by means of bridge 12 and supported by rail means 13 disposed on each side of endless conveyor belt 11. Rail means 13 comprise essentially horizontal elements 131,132 and essentially vertical elements (only rearwardly disposed essentially vertical element 133 is shown; the essentially vertical element disposed frontwardly is omitted for sake of clarity). The length of a trolley is typically in the range from 5 to 15 inches, preferably from 6 to 12 inches and most preferably from 7 to 9 inches. Trolley 10 comprises two pairs of support rollers 141,142 and 143,144 interconnected by and disposed outside of bracket means 151,152. Typically, the diameter of the support rollers ranges from 1 to 3 inches, preferably from 1.5 to 2.5 inches and their width from 0.2 to 0.8 inches, preferably from 0.3 to 0.5 inches. Buffer roller 16 comprising cylindrical body 161 and central core 163 is disposed between two pairs of support rollers 141,142 and 143,144 and inside of bracket means 151,152. Buffer roller 16 is supported by bracket means 151,152 in a freely rotatable manner and distanced from endless conveyor belt 11. Bracket means 151,152 provided with abutting means 171,172 are interconnected by two rods or bars 181,182; one rod or bar 181 is encompassed by bridge 12. At the ends of rods or bars 181,182 extending through bracket means 151,152, aside from support rollers 141,142, 143,144, lateral slide means are disposed (only lateral slide means 192,194 are visible). Typically, the diameter of the slide means ranges from 0.4 to 1.6 inches, preferably from 0.8 to 1.2 inches.

Figure 2:
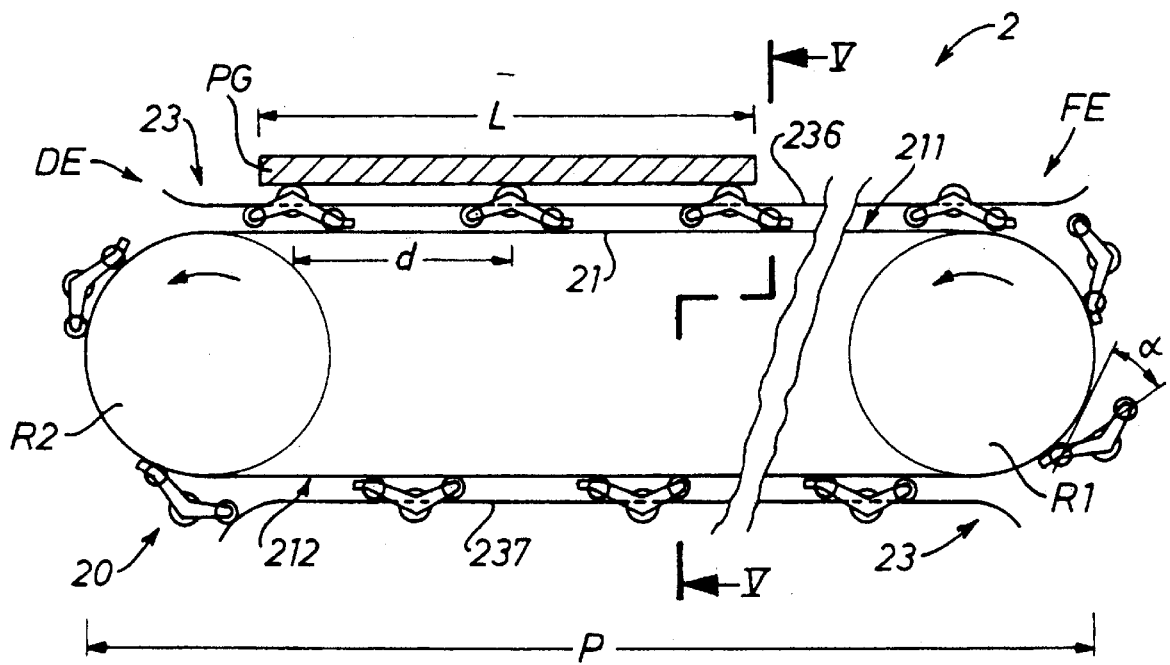
FIG. 2 is a diagrammatic side view of the process of transporting piece goods by means of an accumulation conveyor system according to the invention.

FIG. 2 shows diagrammaticly the process of transporting piece goods PG, e.g. a palette, along path P from feeding end FE to delivery end DE. The represented side view of FIG. 2 shows actively transporting element 2 of the accumulation conveyor system comprising endless conveyor belt 21 for circulation around two guide rolls R1,R2 and forming upper train 211 for motion in one direction and lower train 212 for motion in opposite direction. A plurality of trolleys 20 are connected to endless conveyor belt 21 at distance d between any two adjacent trolleys which is smaller than length L of piece good PG. Distance d between the trolleys is typically in the range from 15 to 80 inches, preferably from 20 to 60 inches and most preferably from 25 to 50 inches. Trolleys 20 are supported by rail means 23 disposed on both sides of endless conveyor belt 21 along path P and formed as U-shaped channels which open towards endless conveyor belt 21. For sake of clarity, FIG. 2 shows only upper essentially horizontal element 236 of the U-shaped channels for upper train 211 and lower essentially horizontal element 237 of the U-shaped channels for lower train 212. For preferred embodiments, as the one of FIG. 2, is rail means 23 are only disposed at the straight sections of endless conveyor belt 21 to avoid costly bent guiding rails and constraints at reversal. Proper guiding of trolleys 20 during reversal at guide rolls R1,R2 are ascertained by limitation of pivoting motion of trolleys 20 to angle α not more than 30° by way of abutting means connected to bracket means (cf Fig. 1 for a more detailed view of abutting means). As shown, upper essentially horizontal element 236 of rail means 23 may be bent upwards in the area of feeding end FE and delivery end DE of upper train 211, and lower essentially horizontal element 237 of rail means 23 may be bent downwards at both ends of lower train 212 along path P to assist proper guiding of trolleys at reversal.

Figure 3:
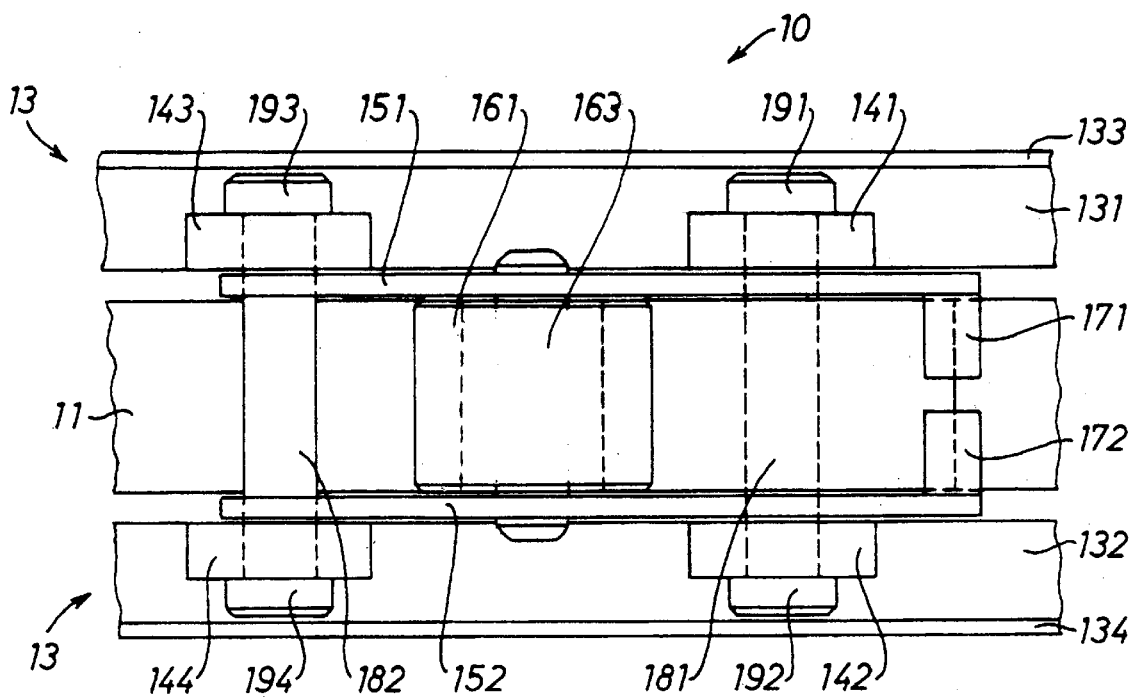
FIG. 3 is a diagrammatic top view of FIG. 1.

FIG. 3 is a diagrammatic top view of trolley 10 of FIG. 1 where all lateral slide means 191,192,193,194 are now shown. Connecting and securing means of lateral slide means 191,192,193,194 are omitted for clarity since they do not require special inventive skills and are known for those skilled in the art.

Figure 4:
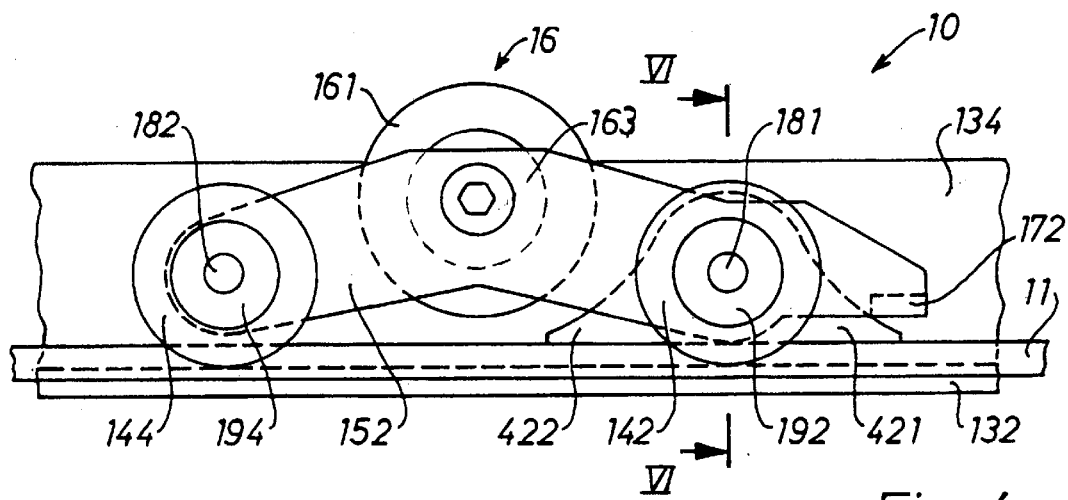
FIG. 4 is a diagrammatic side view of FIG. 1.

The diagrammatic side view of trolley 10 shown in FIG. 4 provides for a more detailed view of bridge 12 of FIG. 1 representing the connection of trolley 10 to endless conveyor belt 11, encompassing rod or bar 181 and allowing for a pivoting motion of trolley 10. A preferred design of bridge 12 is the one showed having a profile similar to a Gaussian curve. Each end 421,422 of bridge 12 is connected to endless conveyor belt 11 by means known for a person skilled in the art.

Figure 5:
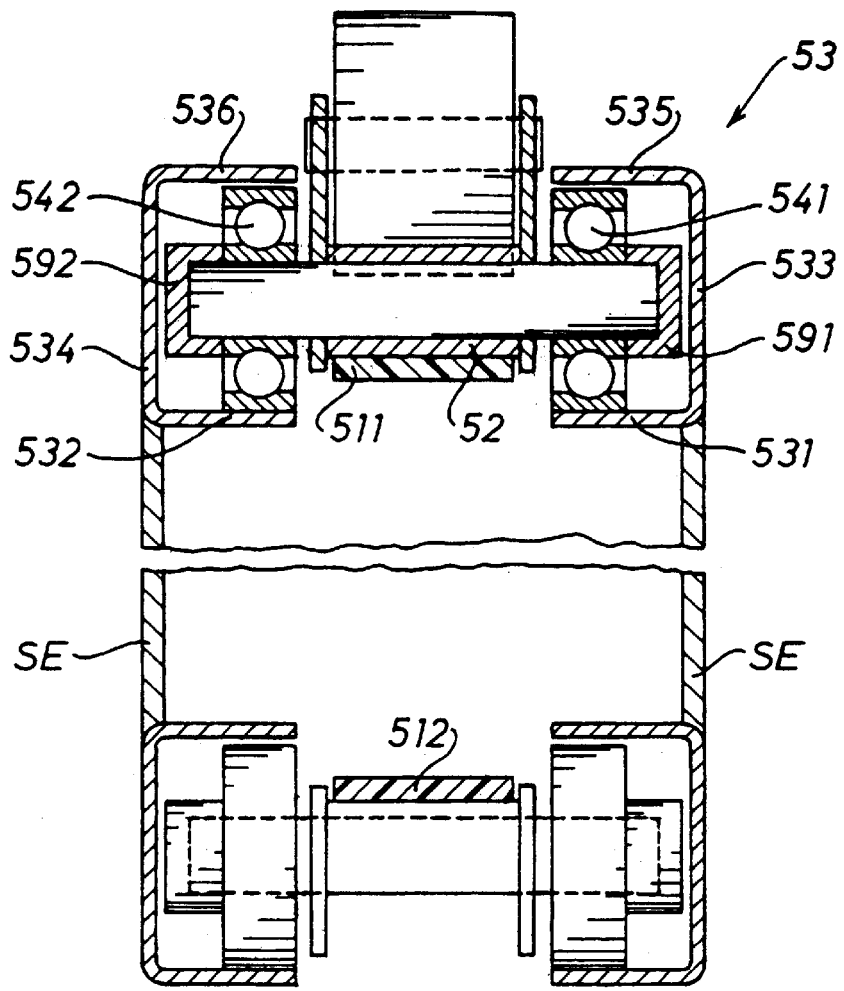
FIG. 5 is a sectional view along line V—V of FIG. 2.

FIG. 5 shows a sectional view of actively transporting element 2 along line V—V of FIG. 2. Rail means 53 are designed as U-shaped channels comprising upper essentially horizontal elements 535,536, essentially vertical elements 533,534 and lower essentially horizontal elements 531,532 as exemplarily described for upper train 511. Lateral slide means 591,592 may contact essentially vertical elements 533,534 of rail means 53 and, thus, serve to laterally guide the trolleys. Lower essentially horizontal elements 531,532 of rail means 53 interact with support rollers 541,542, which are preferably normal ball or roller bearings. In the preferred embodiment of the accumulation conveyor and the accumulation system shown, rail means 53 are part of the supporting framework of the conveyor and conveyor system as indicated by structural support elements SE.

Figure 6:
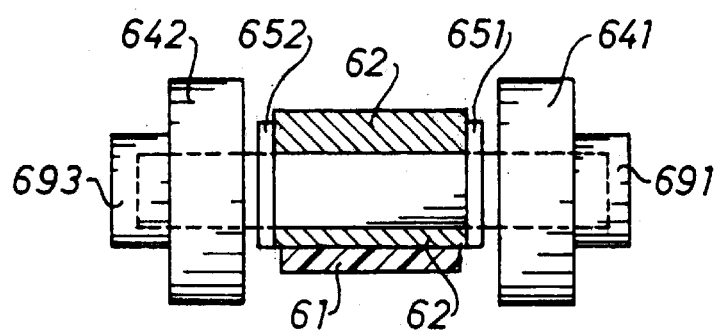
FIG. 6 is a sectional view along line VI—VI of FIG. 4.

FIG. 6 is a sectional view along line VI—VI of FIG. 4 showing bridge 62 being connected to endless conveyor belt 61. Support rollers 641,642 and lateral slide means 691,693 are disposed outside of bracket means 651,652.

Figure 7:
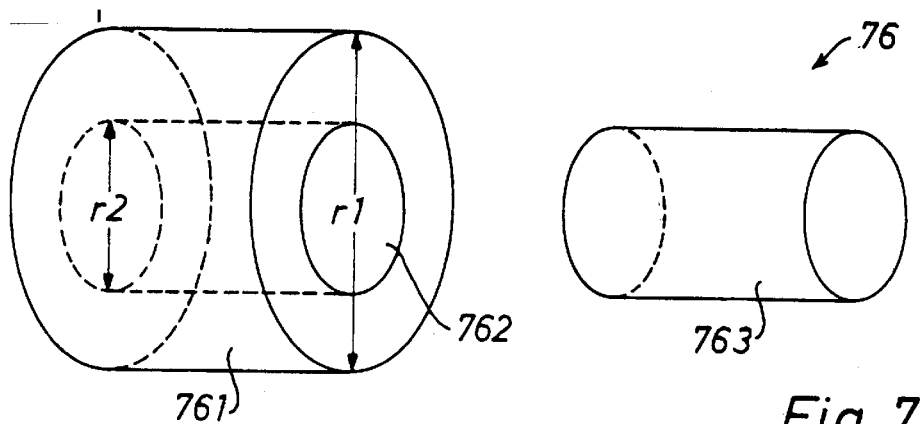
FIG. 7 is a diagrammatic view of a preferred embodiment of a buffer roller according to the invention.

FIG. 7 shows buffer roller 76 defined by cylindrical body 761, central core 762 and axial core 763. In this preferred embodiment of a buffer roller according to the invention central bore 762 has a diameter r2 which is at least one third of outer diameter r1 of cylindrical body 761. The outer diameter r1 of the buffer roller is generally in the range from 1.5 to 4.5 inches, preferably from 2 to 4 inches, most preferably from 2.5 to 3.5 inches.

Figure 8:
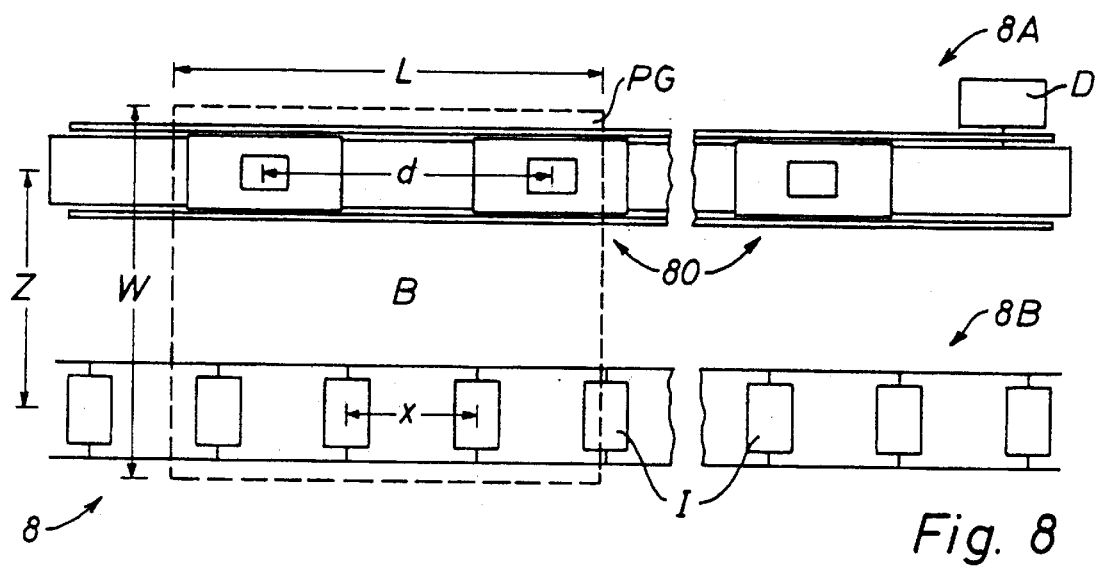
FIG. 8 is a diagrammatic top view of a preferred embodiment of an accumulation conveyor system for transporting piece goods according to the invention.

FIG. 8 shows accumulation conveyor system 8 as a preferred embodiment for transporting piece goods, e.g. palette PG, according to the invention. Palette PG has a base surface B defined by length L and width W. Accumulation conveyor system 8 comprises one actively transporting element 8A connected to drive D and one passively transporting element 8B. Transporting elements 8A and 8B are arranged side by side and essentially parallel at distance Z smaller than width W of palette PG. Passively transporting element 8B consists essentially of a series of idle rollers I arranged substantially in parallel with each other at distance x is smaller than length L of palette PG. Accordingly, a plurality of trolleys 80 is connected to the endless conveyor belt of actively transporting element 8A at distance d which is smaller than length L of palette PG.

Figure 9:
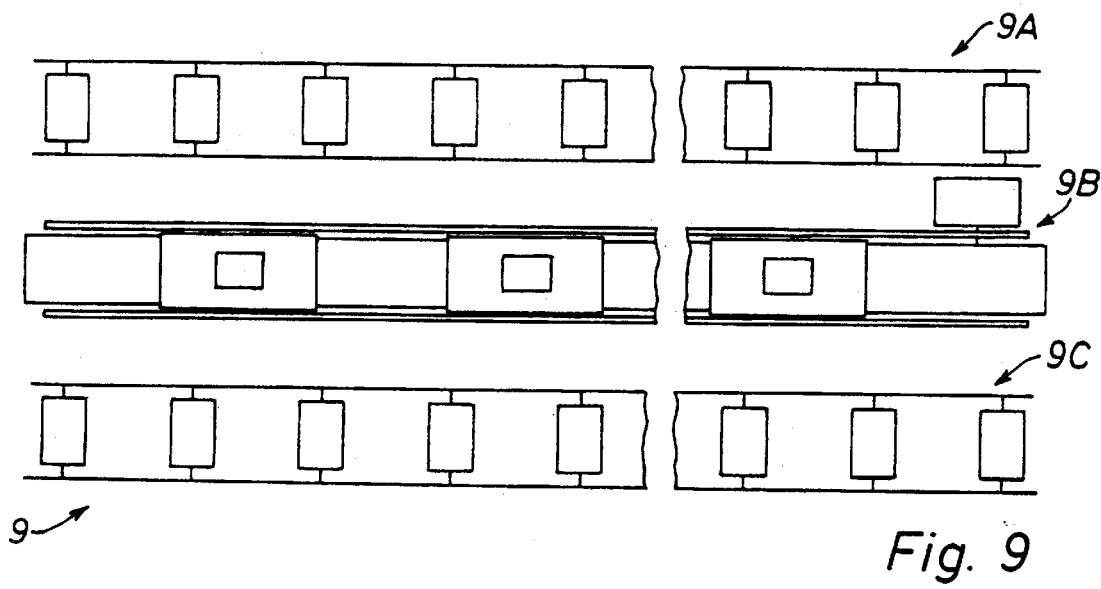
FIG. 9 is a diagrammatic top view of a further preferred embodiment of an accumulation conveyor system for transporting piece goods according to the invention.

FIG. 9 shows accumulation conveyor system 9 for transporting piece goods as a further preferred embodiment according to the invention. One actively transporting element 9B is arranged between two passively transporting elements 9A and 9C.

Various modifications of the embodiments described will be apparent for those skilled in the art within the scope of the invention.

What is claimed is:

1. An accumulation conveyor comprising:
    an endless conveyor belt for circulation around at least two guide rolls and forming an upper train for motion in a first direction and a lower train for motion in a second direction opposite to said first direction,
    at least one of said guide rolls being connected with a drive;
    a plurality of mutually distanced trolleys connected to said endless conveyor belt;
    rail means for supporting said trolleys at least in the area of said upper train;
    wherein:
        each of said trolleys comprises two pairs of support rollers for interaction with said rail means;
        a pair of bracket means for interconnecting said two pairs of support rollers;
        and a buffer roller supported by said bracket means in a freely rotatable manner between said two pairs of support rollers and distanced from said conveyor belt;
        said rail means comprising an essentially horizontal element for vertically supporting said trolleys, and an essentially vertical element for laterally guiding said trolleys;
    one of said pairs of support rollers of each of said trolleys is provided with lateral slide means for contact with said essentially vertical element of said rail means;
    each of said trolleys comprises two rods or bars interconnecting said bracket means and having two ends extending through said bracket means, said support rollers being rotatable mounted on said ends, and said ends of said interconnecting rods or bars further carrying said lateral slide means;
    said connection between each of said trolleys and said endless conveyor belt is formed by a bridge of an elastomeric material, said bridge having two ends, each of which ends is connected to said belt; and said bridge encompassing one of said rods or bars so as to allow for a pivoting motion of each of said trolleys relative to said belt.

2. The conveyor of claim 1 wherein said lateral slide means are made of a synthetic polymer composition capable of self-lubrication when in contact with said vertical element of said rail means.

3. The conveyor of claim 1 wherein each trolley is provided with an abutting means connected with said brackets and limiting said pivoting motion to an angle of not more than about 30°.

4. The conveyor of claim 1 wherein said first direction of motion of said belt defines a leading end and a trailing end of each of said trolleys, said connection between each of said trolleys and said endless conveyor belt being provided near said trailing end of each of said trolleys.

5. The conveyor of claim 1 wherein said buffer roller essentially consists of a cylindrical body made of a synthetic polymer material for rotation around an axle made of a structural metal, said polymer material being capable of self-lubrication when in contact with said axle.

6. The conveyor of claim 5 wherein said cylindrical body of said buffer roller has an outer diameter and a central bore for holding said axle in a self-lubricating manner, said central bore having a diameter which is at least one third of said outer diameter.

7. The conveyor of claim 1 wherein said endless conveyor belt has a width in the range of from about 1.5 to 5 inches.

8. The conveyor of claim 1 wherein said endless conveyor belt is formed of a fiber-reinforced elastomeric material.

9. The conveyor of claim 1 wherein said rail means comprise a further essentially horizontal element to form U-shaped channels that open toward said endless conveyor belt.

10. An accumulation conveyor system for transporting piece goods along a predetermined path, said goods having a base surface defined by a length and a width extending between two sides of said goods; said system comprising in an essentially parallel arrangement and in a mutually spaced relation at least one passively transporting element and at least one actively transporting element;

said at least one passively transporting element consisting essentially of a series of idle rollers arranged substantially in parallel with each other and at a distance between any two adjacent rollers which is smaller than said length of said goods and forming an elongated and substantially continuous and substantially equiplanar path for supporting a portion of said base surface of said goods;

and said at least one actively transporting element comprising an endless conveyor belt for circulation around at least two guide rolls and forming an upper train for motion in a first direction and a lower train for motion in a second direction opposite to said first direction, at least one of said guide rolls being connected with a drive;

a plurality of trolleys connected to said endless conveyor belt at a mutual distance between any two adjacent trolleys which is smaller than said length of said goods;

rail means for supporting said trolleys at least in the area of said upper train; wherein each of said trolleys comprises two pairs of support rollers for interaction with said rail means;

a pair of bracket means for interconnecting said two pairs of support rollers;

and a buffer roller supported by said bracket means in a freely rotatable manner between said two pairs of support rollers and distanced from said conveyor belt; said rail means comprising an essentially horizontal element for vertically supporting said trolleys, and an essentially vertical element for laterally guiding said trolleys;

said at least one passively transporting element and said at least one actively transporting element cooperating to commonly support said base surface of each of said goods and to convey said goods along said predetermined path having a feeding end and a delivery end; said system providing for smooth accumulation of goods on path as soon as movement of one of said goods closest to said delivery end is arrested.

11. The system of claim 10 wherein one said actively transporting element and one said passively transporting element are arranged side by side at a distance for supporting a first base portion of said goods on said actively transporting element and a second base portion of said goods on said passively transporting element.

12. The system of claim 10 wherein one said actively transporting element is arranged between two said passively transporting elements.

* * * * *